United States Patent [19]

Glessner et al.

[11] Patent Number: 4,636,235

[45] Date of Patent: Jan. 13, 1987

[54] METHOD FOR PRODUCING OPTICAL FIBERS

[75] Inventors: Bertram Glessner, Düsseldorf; Paul Pitsch, Monchen-Gladbach; Peter Heinen, Waldfeucht; Hartmut Peglow, Willich, all of Fed. Rep. of Germany

[73] Assignee: AEG-Telefunken Kabelwerke AG, Rheydt, Monchen-Gladbach, Fed. Rep. of Germany

[21] Appl. No.: 737,170

[22] Filed: May 23, 1985

[30] Foreign Application Priority Data

May 26, 1984 [DE] Fed. Rep. of Germany ....... 3419835
Dec. 22, 1984 [DE] Fed. Rep. of Germany ....... 3447081

[51] Int. Cl.$^4$ ........................................... C03B 37/023
[52] U.S. Cl. ........................................ 65/3.12; 65/13
[58] Field of Search ..................... 65/2, 13, 3.12, 3.11

[56] References Cited

U.S. PATENT DOCUMENTS

| | | | |
|---|---|---|---|
| 4,121,919 | 10/1978 | Sergent et al. | 65/3.12 |
| 4,251,251 | 2/1981 | Blankenship | 65/3.12 |
| 4,486,214 | 12/1984 | Lynch et al. | 65/3.12 |
| 4,505,729 | 3/1985 | Matsumura et al. | 65/3.11 |
| 4,551,162 | 11/1985 | Hicks | 65/4.2 |

FOREIGN PATENT DOCUMENTS

| | | |
|---|---|---|
| 0109192 | 5/1984 | European Pat. Off. |
| 2827303 | 1/1979 | Fed. Rep. of Germany |
| 2922665 | 12/1979 | Fed. Rep. of Germany |
| 2938218 | 4/1981 | Fed. Rep. of Germany |
| 3106412 | 10/1981 | Fed. Rep. of Germany |
| 3132010 | 3/1983 | Fed. Rep. of Germany |
| 3405812 | 8/1984 | Fed. Rep. of Germany |
| 3315165 | 10/1984 | Fed. Rep. of Germany |

Primary Examiner—Robert Lindsay
Attorney, Agent, or Firm—Spencer & Frank

[57] ABSTRACT

A process is disclosed for producing an optical fiber comprising forming a tubular glass body having at least one doped layer, at least one concentric layer, each layer having a different index of refraction, and a hollow center. The glass body is heated until the softening point is reached, and is then drawn into a glass fiber. During drawing, a partial vacuum is maintained in the hollow center of the tubular glass body, the partial vacuum being of sufficient magnitude to reduce the evaporation of doping material from the interior of the tubular glass body and thereby effectively prevent a reduction in the index of refraction in the center of the optical fiber.

19 Claims, 8 Drawing Figures

METHOD FOR PRODUCING OPTICAL FIBERS

BACKGROUND OF THE INVENTION

The present invention relates to a method for producing an optical fiber by first producing a tubular glass body having concentric regions of different indices of refraction and drawing the glass body into a glass fiber.

Optically conductive glass fibers are drawn from preforms. According to the CVD [chemical vapor deposition] process, a tube comprising a glass jacket is coated with a glass core in its interior. The glass core is composed, in particular, of silicon dioxide ($SiO_2$) doped with germanium dioxide ($GeO_2$), and has a higher index of refraction than the glass jacket. With the OVD [Outside vapor deposition] process, it is also possible to first coat a rod-shaped form with a doped glass core and then coat the glass core with a glass jacket, and ultimately removing the mandrell. In both cases, a tubular glass body is obtained, in some cases after vitrifying the applied layers. The tubular glass body is then heated, beginning at one end and progressing along its length, until the softening point is reached and the softened tube collapses into a solid body. The collapsing may be a separate process step or may be effected together with drawing the fiber.

In the glass core, particularly when doped with $GeO_2$, an annoying dip in the index of refraction has been observed in its central region. This dip is the result of the high heat required in the collapsing and fiber drawing steps, which causes $GeO_2$ to be evaporated, primarily from the tube's interior surface. Consequently, a central region poorer in $GeO_2$ is produced in the collapsed core. Such a dip in refractive index, originally produced in the preform, is then also present, in a geometrically equivalent shape, in the drawn optical fiber.

This undesirable dip in the index of refraction, depending on its size, produces the following disadvantageous physical effects in

Multimode Graded Index Fibers reduction of coupling efficiency;
reduction of transmission bandwidth;
error interpretation in the DMD [Differential Mode Delay] measuring method;
negative influence on the factor in large optical fiber path lengths; and
sensitivity of bandwidth measurement with respect to launching conditions and microbending effects.

Monomode Fibers increase of microcurvature sensitivity
influence on the cut-off wavelength In spite of numerous experiments, it has not been possible in the past to completely avoid the refractive index dip; it was merely possible to reduce it. One prior art method achieved a small reduction of the refractive index dip by precollapsing the initially larger interior diameter of the coated tube to form a hollow center space of lesser diameter. After this reduction in size, the $GeO_2$ deficient inner surface layer was removed by etching. This precollapsing and etching process was performed until the smallest possible inner diameter remained, such that during the subsequent final collapsing step only a relatively small percentage of $GeO_2$ deficient area remained to produce a small dip zone. Another known method for reducing the dip is to add germanium containing substances during the collapsing step to counteract the $GeO_2$ reduction.

SUMMARY OF THE INVENTION

The known methods for reducing the dip are complicated and not fully satisfactory, since a small residual dip in refractive index cannot be avoided. It is, therefore, an object of the present invention to develop a process for the production of optical fibers which avoids the dip as completely as possible.

This is accomplished in the present invention by maintaining a subatmospheric pressure (partial vacuum) in the interior of the tubular glass body during drawing, with the reduced pressure being selected such that the finished glass fiber has essentially no dip in refractive index.

The present invention is based on our discovery that the dip can be avoided by selecting an appropriate subatmospheric pressure to be maintained within the tubular glass body. In some embodiments, the heating and drawing is conducted within an environment of subatmospheric pressure, with the pressure within the glass tube even further reduced.

In addition, care is preferably taken that the glass fiber produced according to the present invention has a cross section that is as circular as possible. This is accomplished, according to a further feature of the invention, preferably by making the tubular glass body sufficiently mechanically stable by precollapsing that, during the subsequent fiber drawing step at subatmospheric pressure, no glass fiber is produced which has an elliptical cross section. For this purpose, the tubular glass body, before the fiber is drawn, must have the corresponding geometry; for example, it should have a correspondingly small inner diameter or a correspondingly small ratio of inner diameter to outer diameter.

This ratio depends viscosity of the cladding material and of the composition of the core glass and is also correlated with the used low pressure.

The optimum ratio of inner to outer diameter, to prevent an elliptical core area, can be find out by simple experiments.

The process according to the present invention brings the surprising result that the creation of a dip during processing, and the dip itself, can be completely avoided, or avoided to the extent that the resulting fiber has satisfactory optical characteristics. The optical characteristics of fibers prepared by this process are significantly better than those of fibers produced by prior art methods. The subatmospheric pressure (partial vacuum) maintained in the interior of the glass body may be of any effective value; in practice, the pressure is reduced only to the point where it is assured that formation of a dip in refractive index will not occur.

The minimum vacuum required depends on the type of materials used for the preform, particularly the doping substances. Optimum pressure values for each respective case can be determined by way of simple experiments, wherein, for example, a test preform is drawn into a fiber with the pressure being varied along its length. By measuring the refractive index of the various regions in the fiber, the level of reduced pressure can be determined at which the refractive index dip disappears or becomes unnoticeably small.

According to one embodiment of the invention, a tubular glass body is precollapsed without employing a partial vacuum before the drawing step. In this case, if a doping layer from which doping material has evaporated is present in the glass tube, the deficient doping layer is best removed before drawing.

It is preferred, however, to prevent the creation of a deficient doping layer in the glass tube before the step of collapsing by keeping the glass body within an environment of subatmospheric pressure. It is even more preferable to reduce the pressure within the tubular glass body with respect to the pressure acting on the outer wall, and maintain that reduced pressure during the step of fiber drawing in an environment of subatmospheric pressure is reduced.

The present invention has quite a broad applicability. Accordingly, it is not important, for example, whether the region having the varying index of refraction is produced by internal or external deposition process.

The internal or external coating layers of the glass tube in the process according to the present invention are composed, for example, of doped silicon. Germanium dioxide, phosphorus pentoxide, or a combination of the two are examples of useful doping substances.

DETAILED DESCRIPTION OF THE EMBODIMENTS

The present invention will now be described in connection with various embodiments.

Figure 1:
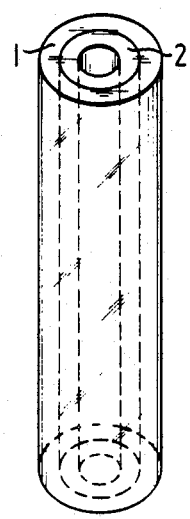
FIG. 1 is a top isometric view of a layered glass tube of the invention having a hollow center.

The tubular glass body shown in FIG. 1 is composed of an outer jacket layer 1, consisting essentially of pure $SiO_2$ glass, and an inner core layer 2, consisting essentially of $SiO_2$ glass doped with $GeO_2$. The $GeO_2$ content increases toward the center so that the desired gradient profile of the index of refraction is produced according to an exponential curve in the core of the glass fiber to be drawn.

Figure 2:
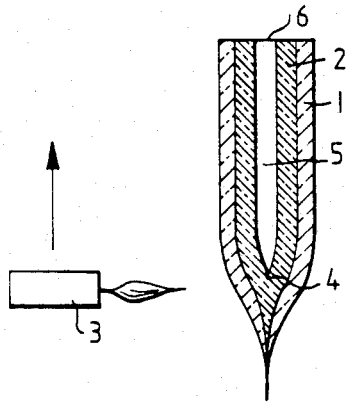
FIG. 2 is a sectional side view of the layered tube collapsed after being softened on exposure to a heat source. The softened collapsed section is shown as being drawn into a fiber.

In FIG. 2, a heat source (burner or furnace) 3 is used to heat the tubular glass body in a defined region 4 until the softening point is reached. The softened portion is drawn to form a glass fiber. In part 5 of the body, which has not yet been drawn into a glass fiber and is therefore still tubular, a subatmospheric pressure is maintained of such magnitude that a dip formation in the glass fiber is prevented. The subatmospheric pressure in region 5 is generated by conventional means, for example, by connecting a vacuum pump to opening 6.

In order for the tubular body not to be shaped into an elliptical fiber due to the internal subatmospheric pressure, the wall thickness of the body relative to its inner diameter must be sufficiently large. In FIG. 2 a tube having a relatively large outer diameter and a relatively thin wall thickness, coated in its interior according to the VCVD (vertical chemical vapor-deposition) process, was initially precollapsed with an atmospheric internal pressure. The resulting $GeO_2$ deficient inner layer was removed by etching. During a subsequent final drawing into the fiber according to FIG. 2, an internal subatmospheric pressure of, for example, 400 mbar was maintained; accordingly, no $GeO_2$ deficient internal region was able to form in the fiber.

Figure 3:
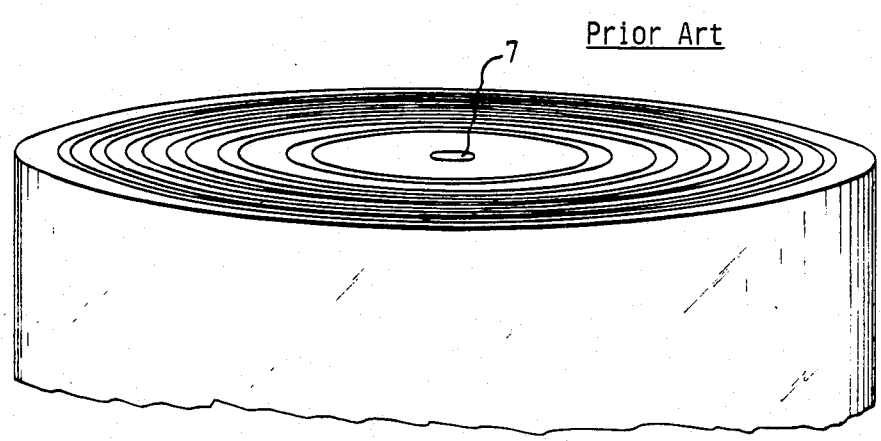
FIGS. 3 and 4 are isometric end views of fibers wherein the rings represent layers having different indices of refraction.
Figure 4:
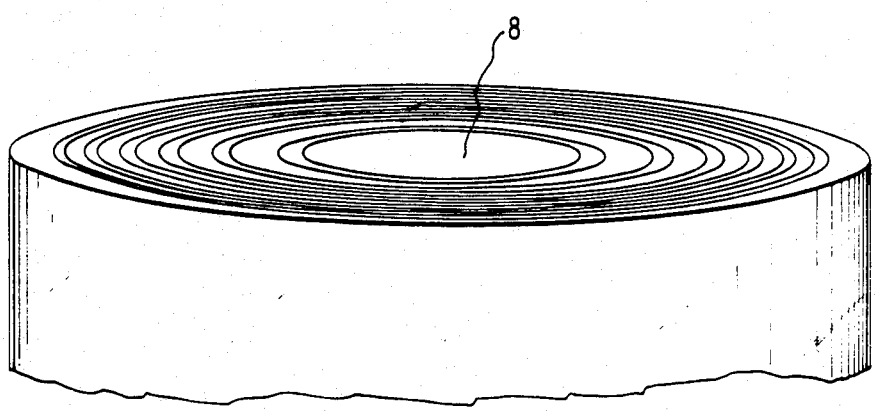

While the glass fibers produced according to prior art methods have a dip 7 (reduced index of refraction) in their center, as shown in FIG. 3, the glass fibers produced according to the present invention, as shown in FIG. 4, do not exhibit a dip. The concentric rings in FIGS. 3 and 4 represent concentric regions of varying index of refraction.

Instead of only one inner layer, generally a very large number of layers having different indices of refraction are applied during the manufacture of the glass fibers, these layers being given reference numeral 8 in FIG. 4. The undesirable dip visible in FIG. 3 is a region that is deficient in germanium dioxide.

Figure 5:
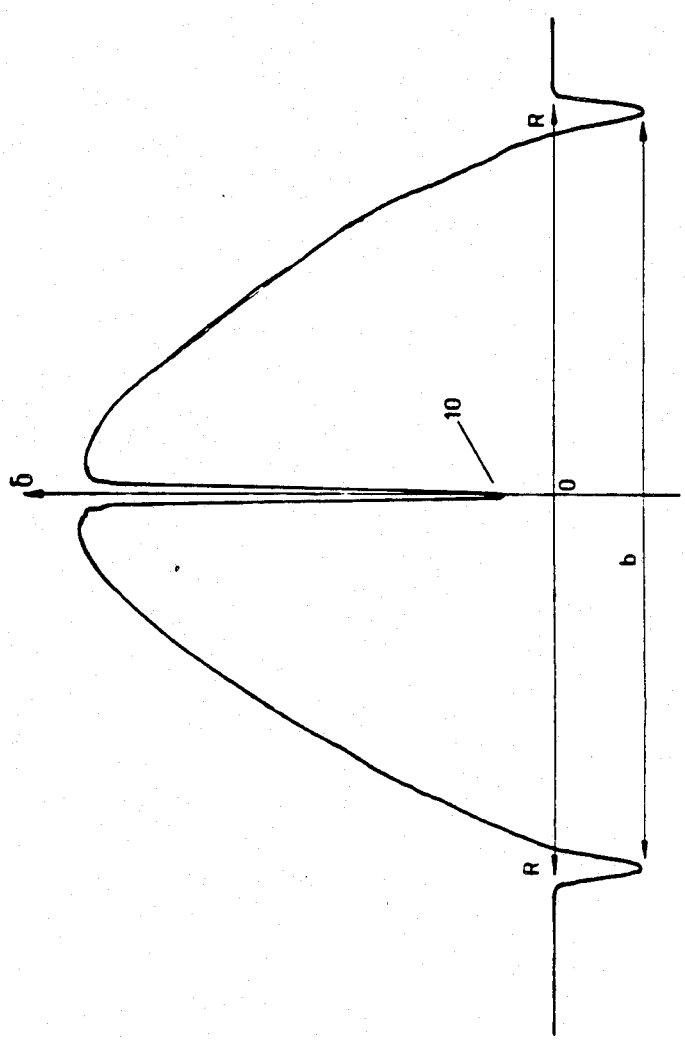
FIGS. 5 and 6 are graphical representations of the indices of refraction over the cross section of an optical fiber produced by the prior art and by the present invention, respectively.

FIG. 5 is a refractive index curve for an optical fiber formed according to the methods of the prior art, exhibiting a dip 10 in refractive index at the center of the fiber.

Figure 6:
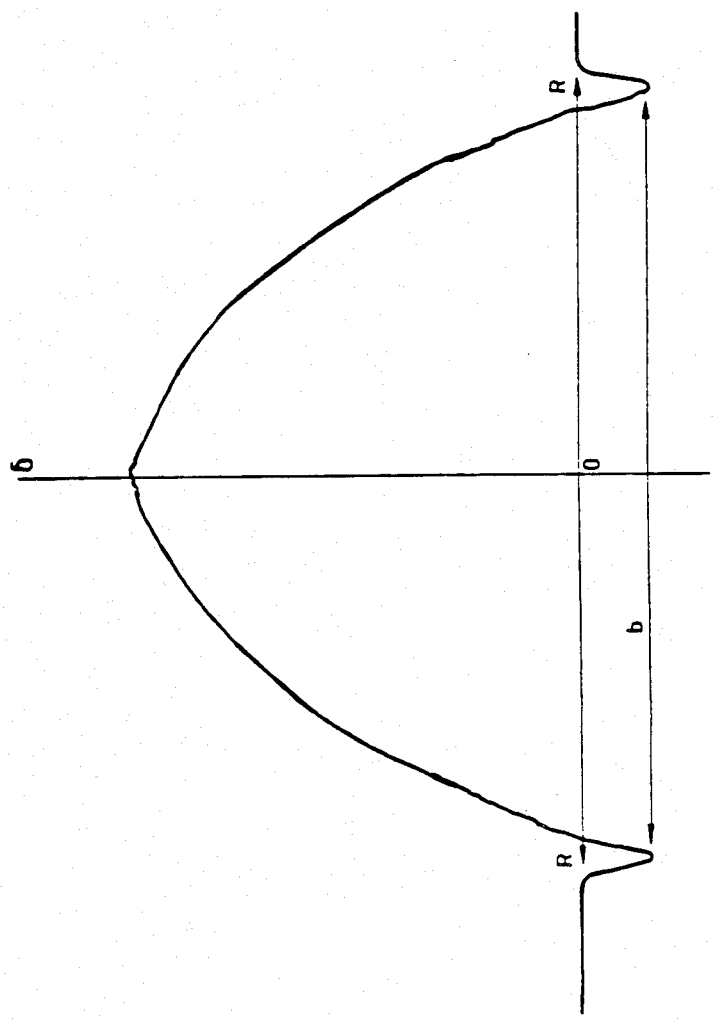

FIG. 6 is a refractive index curve for an optical fiber formed by the process of the invention, exhibiting the maximum refractive index at the center of the fiber.

Figure 7:
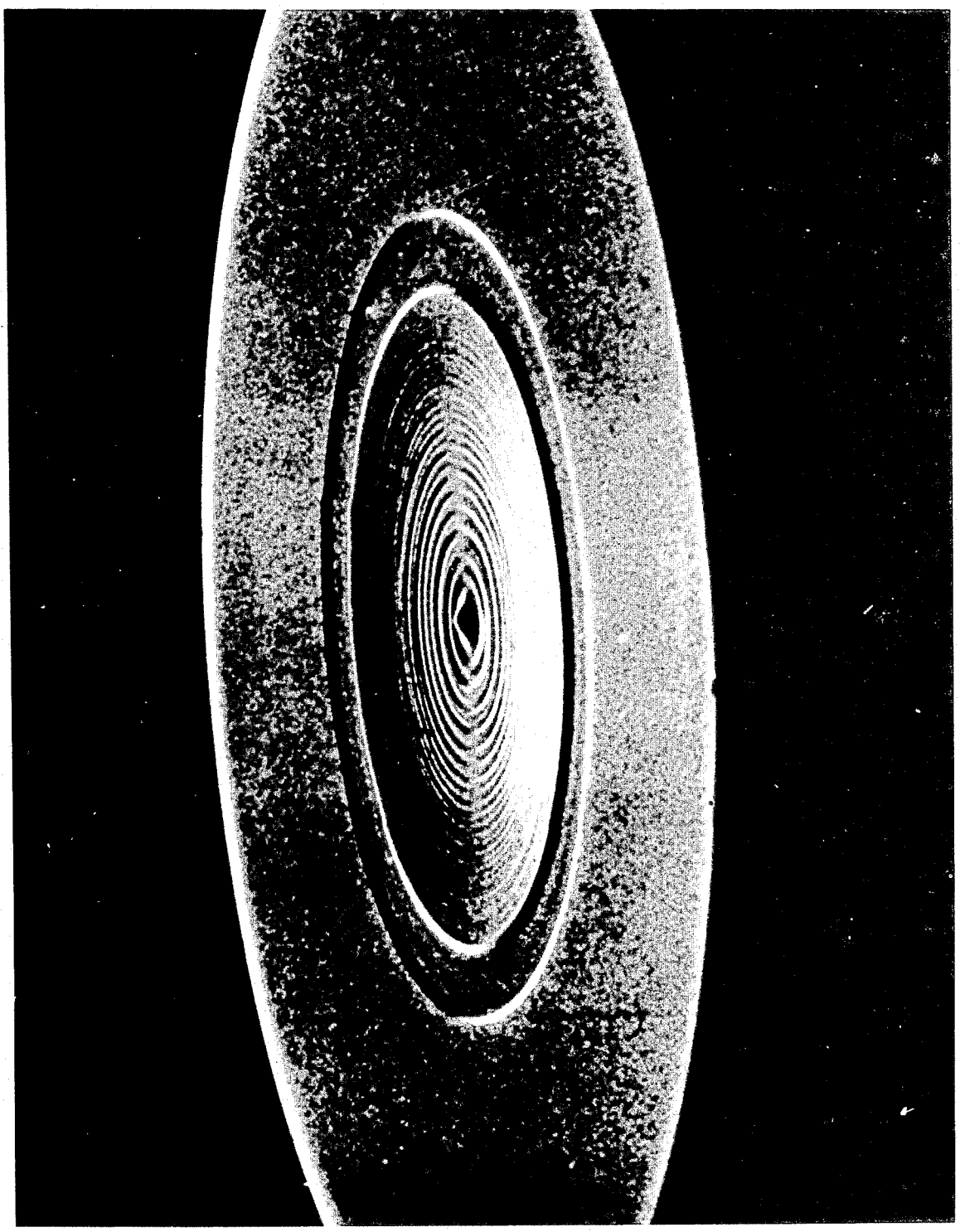
FIGS. 7 and 8 show a Scanning Electrobeam Microscope Photograph of the prior art and of the invention respectively.

FIG. 7 shows the Scanning Electronbeam Microscope-Photograph of a fiber with an central dip. (Magnification 2000 fold)

Figure 8:

FIG. 8 is the Scanning Electronbeam Microscope-Photograph of a fiber prepared by the process of the invention. (Magnification 10,000 fold)

The embodiments of this invention set forth above are presented for purposes of illustration and are not intended to limit the invention. The invention described herein is intended to encompass all embodiments, modifications, adaptations and equivalents of the methods within by the scope of the following claims.

What is claimed is:

1. An improved process for producing an optical fiber characterized by having essentially no reduction in index of refraction in the center of the optical fiber, comprising:

forming a tubular glass body having a hollow center and at least two concentric layers, at least one interior layer being doped, each layer having an index of refraction different from at least one of said other layers;

applying a partial vacuum to said hollow center of said tubular glass body;

heating said tubular glass body under said partial vacuum until the softening point of said tubular glass body is reached; and drawing said softened tubular glass body under said partial vacuum into a glass fiber, said partial vacuum being of sufficient magnitude to reduce evaporation of dopant from said interior layer of said tubular glass body, thereby effectively preventing a reduction in index of refraction in the center of the optical fiber.

2. The process of claim 1, wherein the glass fiber has a circular cross section.

3. The process of claim 2, wherein the tubular glass body is precollapsed before drawing, thereby ensuring its mechanical stability during drawing under less than atmospheric pressure.

4. The process of claim 3, wherein the tubular glass body is precollapsed at atmospheric pressure before drawing.

5. The process of claim 1, wherein a doped layer deficient in doping material is present in the tubular glass body and said deficient doped layer is removed before drawing.

6. The process of claim 1, wherein the evaporation of doping material from the doped layer before collapsing under low pressure is prevented.

7. The process of claim 6, wherein the tubular glass body is maintained under a pressure of less than atmospheric pressure.

8. The process of claim 7, wherein the pressure in the interior of the tubular glass body is less than the pressure acting on the outer wall of the tubular glass body.

9. The process of claim 1, wherein the at least one concentric layer having a different index of refraction from that of the doped layer comprises an essentially pure $SiO_2$ glass layer.

10. The process of claim 1, wherein the doped layer is a coating layer.

11. The process of claim 10, wherein the coating layer is composed of doped silicon.

12. The process of claim 11, wherein the doped silicon comprises a doping substance selected from the group consisting of germanium dioxide, phosphorus pentoxide, and a combination of germanium dioxide and phosphorus pentoxide.

13. The process of claim 1 wherein said optical fiber exhibits a maximum refractive index at the center of the optical fiber.

14. An improved process for producing an optical fiber characterized by having essentially no reduction in index of refraction in the center of the optical fiber, comprising:
applying a partial vacuum to a tubular glass body having a hollow center and at least two concentric layers, at least one interior layer being doped, and each layer having an index of refraction different from at least one of said other concentric layers;
heating said tubular glass body under said partial vacuum until the softening point of said tubular glass body is reached; and
drawing said softened tubular glass body under said partial vaccum into a glass fiber, said partial vacuum being of sufficient magnitude to reduce evaporation of dopant from said interior doped layer of said tubular glass body, thereby effectively preventing a reduction in index of refraction in the center of the glass fiber.

15. The process of claim 14, wherein said the glass fiber has a circular cross section.

16. The process of claim 15, wherein said tubular glass body is precollapsed before drawing.

17. The process of claim 14, wherein said optical fiber exhibits a maximum refractive index at the center of the fiber.

18. The process of claim 14, wherein said dopant is selected from the group consisting of germanium dioxide, phosphorus pentoxide, and a mixture of germanium dioxide and phosphorus pentoxide.

19. The process of claim 18 wherein the optical fiber exhibits a maximum refractive index at the center of the fiber.

* * * * *